United States Patent
Weng et al.

(10) Patent No.: US 10,380,690 B2
(45) Date of Patent: Aug. 13, 2019

(54) DATASET CLEANSING

(71) Applicant: Chicago Mercantile Exchange Inc., Chicago, IL (US)

(72) Inventors: Jennifer Weng, Chicago, IL (US); Nataliya Frost, Chicago, IL (US); Shuo Liu, Chicago, IL (US); Panagiotis Xythalis, Chicago, IL (US); Lingrui Xiang, Chicago, IL (US); Xianqing Zou, Chicago, IL (US); Hariharan Kesavarao, Chennai (IN); Jie Zhu, Livingston, NJ (US); Abhinaw Prakash, Jharkhand (IN)

(73) Assignee: Chicago Mercantile Exchange Inc., Chicago, IL (US)

( * ) Notice: Subject to any disclaimer, the term of this patent is extended or adjusted under 35 U.S.C. 154(b) by 1004 days.

(21) Appl. No.: 14/718,670

(22) Filed: May 21, 2015

(65) Prior Publication Data
US 2016/0343080 A1  Nov. 24, 2016

(51) Int. Cl.
*G06Q 40/06* (2012.01)
*G06F 16/215* (2019.01)

(52) U.S. Cl.
CPC .......... *G06Q 40/06* (2013.01); *G06F 16/215* (2019.01)

(58) Field of Classification Search
CPC ........ G06Q 10/00; G06Q 20/00; G06Q 30/00; G06Q 40/00
USPC ...................................................... 705/3–44
See application file for complete search history.

(56) References Cited

U.S. PATENT DOCUMENTS

| | | | |
|---|---|---|---|
| 5,398,303 A | 3/1995 | Tanaka | |
| 5,714,764 A * | 2/1998 | Takeo | G01N 23/043 250/587 |
| 7,546,258 B2 | 6/2009 | Cheliotis et al. | |
| 7,930,240 B1 * | 4/2011 | Buck | G06Q 40/00 705/37 |
| 7,983,976 B2 * | 7/2011 | Nafeh | G06Q 40/04 705/37 |
| 8,005,736 B2 * | 8/2011 | Botzer | G06Q 10/10 705/35 |
| 8,260,622 B2 * | 9/2012 | Chron | G06Q 10/06 705/1.1 |
| 8,554,656 B2 * | 10/2013 | Kotelba | G06Q 40/06 705/36 R |
| 2003/0069834 A1 * | 4/2003 | Cutler | G06Q 40/00 705/37 |
| 2005/0027644 A1 * | 2/2005 | Sekiya | G06Q 30/06 705/37 |
| 2005/0075965 A1 * | 4/2005 | Cutler | G06Q 40/00 705/37 |

(Continued)

*Primary Examiner* — Frantzy Poinvil
(74) *Attorney, Agent, or Firm* — Lempia Summerfield Katz LLC

(57) ABSTRACT

Datasets may be characterized by patterns. The patterns may be caused or otherwise influenced by external factors, such as temporal, meteorological, and/or system factors. The external factors, as well as the patterns which result in the data values of the dataset because of the external factors, may provide for techniques used to account for missing data elements, outlier data elements and/or otherwise cleanse the dataset. New elements may be generated to provide for the missing data elements, and derivative datasets may be generated based on one or more cleansed datasets.

21 Claims, 10 Drawing Sheets

(56) References Cited

U.S. PATENT DOCUMENTS

| | | | |
|---|---|---|---|
| 2005/0283427 A1* | 12/2005 | Owens | G06Q 40/04 705/37 |
| 2008/0109343 A1* | 5/2008 | Robinson | G06Q 40/04 705/37 |
| 2009/0248564 A1 | 10/2009 | Fallon et al. | |
| 2011/0218902 A1* | 9/2011 | Rosca | G06Q 40/04 705/37 |
| 2011/0302001 A1 | 12/2011 | Fell et al. | |
| 2015/0073956 A1* | 3/2015 | Mayenberger | G06Q 10/067 705/35 |
| 2015/0081398 A1* | 3/2015 | Dorai | G06Q 10/06375 705/7.37 |
| 2017/0236060 A1* | 8/2017 | Ignatyev | G06F 16/2365 706/46 |

* cited by examiner

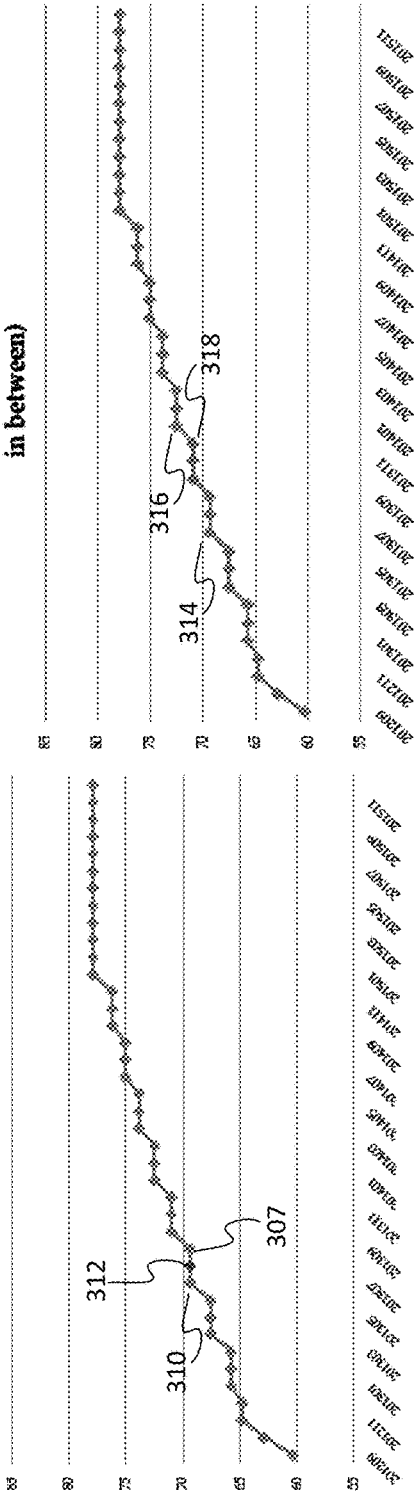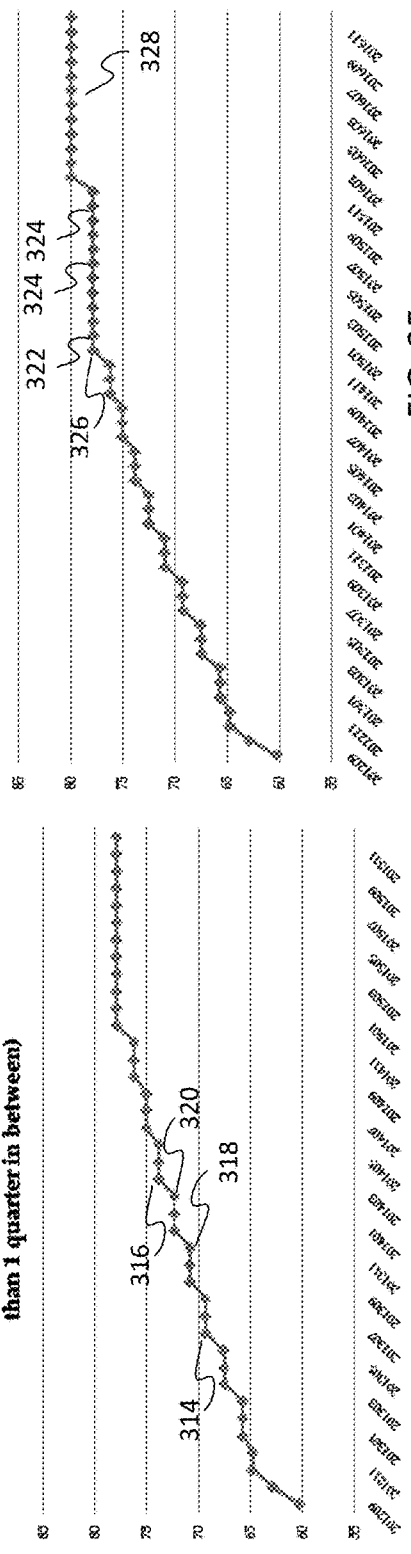

| Type | Product Code | Product Description | Exchange | Extrapolation | Interpolation |
|---|---|---|---|---|---|
| Regular | QL | Coal Futures | NYM | Parallel/Flat | piece-wise constant - per quarter |
|  | MBE | Mont Belvieu Spot Ethylene In-Well Futures | NYM | Parallel/Flat | linear |
|  | MB | Gulf Coast Sour Crude Oil Futures | NYM | Parallel/Flat |  |
|  | CL | Crude Oil Futures | NYM |  | linear |
|  | B | ICE Brent Crude Oil | ICE | Parallel/Flat | linear |
|  | G | ICE Gasoil | ICE | Parallel/Flat | linear |
|  | ULS | ICE Low Sulphur Gasoil | ICE | Parallel/Flat | linear |
| Seasonal | NG | Natural Gas (Henry Hub) Physical Futures | NYM | Backbone + Shape |  |
|  | HO | NY Harbor ULSD Futures | NYM | max/min |  |
|  | RB | RBOB Gasoline Physical Futures | NYM | Backbone + Shape, max/min |  |

FIG. 3L

DATASET CLEANSING

BACKGROUND

A financial instrument trading system, such as a futures exchange, referred to herein also as an "Exchange", such as the Chicago Mercantile Exchange Inc. ("CME"), provides a contract market where financial instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

Typically, the Exchange provides for a centralized "clearing house" through which all trades made must be confirmed, matched, and settled each day until offset or delivered. The clearing house is an adjunct to the Exchange, and may be an operating division of the Exchange, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House. A clearing house may also analyze a market and/or open positions of traders to assess a risk of traders' current positions. The analysis may involve an application of a margin model to quantify the risk of positions held by a trader. Performance bonds may be required from traders to balance this determined risk.

Current financial instrument trading systems allow traders to submit orders and receive confirmations, market data, and other information electronically via a network. These "electronic" marketplaces are an alternative to pit or open outcry based trading systems whereby the traders, or their representatives, all physically stand in a designated location, i.e. a trading pit, and trade with each other via oral and hand based communication. Anyone standing in or near the trading pit may be privy to the trades taking place, i.e. who is trading, what they are offering to trade (price and quantity), and what ultimately trades. Electronic trading systems attempt to replicate the trading pit environment in a marketplace of electronic form. In doing so, electronic trading systems ideally offer an efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Traders and/or electronic marketplaces may use references for pricing and/or performance bond determination. These references may include a dataset that represents a forward curve, also known as a future curve or forward price curve. A forward curve represents a current price for a product in a specific location on a specified date in the future. These forward curves may be derived using actual trades for the product, however, data relating to specific positions or increments of the data may be missing or faulty due to a lack of trades relating to contracts for the product having the criteria indicated for that position. For example, a product may be sold in an electronic marketplace having contracts that require delivery in 10 months, 11 months, 12 months, and 13 months. If no contract is sold for the 11 month delivery contract, no actual data may be available for that 11 month position of the forward curve. In addition, the basic product data may involve erroneous data resulting from atypical trades, system errors, or other reasons. Also, a lack of data, or erroneous data, in a basic product, such as a product upon which prices for other products are derived, may result in anomalous values in the derived product forward curves. As such, systems operating with these forward curves as references are slowed due to the processing of incomplete and/or inaccurate data, which in itself will cause the system to provide faulty results and data.

Accordingly, there is a need for a system and method that can provide complete, consistent, and reasonable data to allow for increased system efficiency and accuracy of data output by the system. The complete, consistent, and reasonable data may also be used by downstream systems to provide more efficient and accurate output data, thus causing an overall increase in interrelated system abilities and accuracy.

BRIEF DESCRIPTION OF THE DRAWINGS

FIGS. 3A-3L illustrate techniques for generating data element values.

DETAILED DESCRIPTION

Figure 1A:
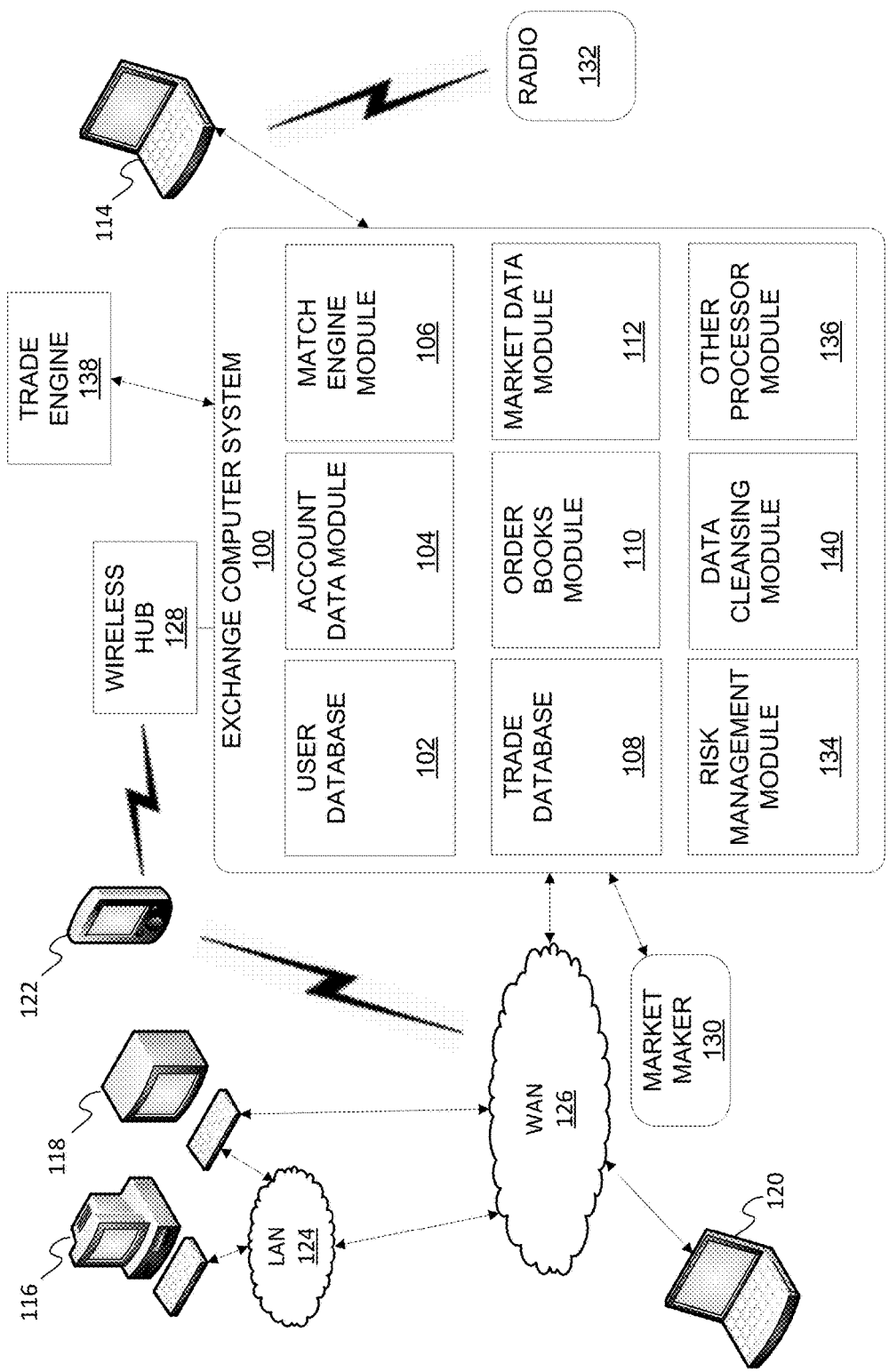
FIGS. 1A-B depict a system for dataset cleansing in a market environment.

The disclosed embodiments relate to identifying anomalies in data sets. The anomalies may include missing data for a segment, position, or increment of an ordered set of data. The anomalies may also include inaccurate, uncharacteristic, or improper data in the ordered set of data. The anomalies may be removed using a pattern of the dataset. These patterns are indicative of specific characteristics of the data of the dataset that result from factors external to the dataset such as factors relating to the system that generates the data, temporal factors, meteorological factors, and/or other external factors. Specific techniques may be used for removing anomalies from data being influenced by specific types of external factors. Through the disclosed embodiments, anomalies in dataset are eliminated and higher quality data is provided for subsequent system operations and data derivations. Such higher quality data allows for a more efficient use of computer resources through a reduction of error handling and associated processes for systems. Therefore, an implementing system will operate at a higher level of efficiency and produce high quality data.

The dataset may be a dataset of a forward curve for a product sold on an electronic exchange. The dataset may involve a collection of ordered data elements, each including a time element and a value that indicates a price for the product as it relates to the time element. The time element may be a delivery date, a maturity date, a time to delivery or maturity, or other time elements. The time elements form the ordered basis for the forward curve (e.g. prices for products specific increments of times to maturity).

Many different products may be based on a same underlier, such as natural gas or crude oil. Products based on a same underlier may have data that shares characteristics based on various factors that affect the price of the underlier. Some of the factors may be temporal, meteorological, environmental, or combinations thereof. For example, some factors may be seasonal in nature, that is, the factors follow characteristics of the seasons as defined by both a temporal calendar and meteorological factors associated therewith. Natural gas is an underlier for products that may have prices influenced by such seasonal factors, as prices for natural gas products tend to fluctuate based on seasonal demand for natural gas driven by high demand in cold weather for domestic heating purposes.

Also, a lack of an influence due to certain factors may also be an external factor that characterizes data of products. For example, crude oil prices do not tend to be affected by the seasonal factors that affect natural gas prices. As such, the data for a crude oil underlying product forward curve and data for a natural gas underlying product forward curve will have different characteristics as driven by the different external factors.

The pattern may be a historical pattern based on characteristics of the source of the data (e.g. underlier, product, or product type) and/or based on or characterized by an external factor (e.g. meteorological and/or temporal factors). These different characteristics may result in different patterns indicated by the ordered datasets. Products based on a seasonally affected underlier may tend to be cyclic in nature, with prices varying with an oscillating pattern corresponding to times of year and/or meteorological cycles associated therewith. Contrarily, products based on an underlier that is not seasonal may tend to have a straight or generally curved pattern, wherein the data of the dataset maintains a general linear relationship over the time values of the ordered incremental set.

Other patterns resulting from other external factors may also be identified. Coal futures is an underlier that may be affected by particular system factors of the electronic trading system in which products based thereon are traded. For example, a system provides that coal futures may be traded in strips that include contracts with delivery dates in multiple individual and consecutive months (e.g. a strip of contracts having delivery dates in January, February, and March). As such, the individual month contracts of the strip period may share a price. The data of products having such an underlier may indicate a stepped pattern.

Datasets of different products sharing an underlier may be grouped and analyzed to determine the most fundamental product of the grouping. The most fundamental product of the grouping may be the product upon which the other products of the grouping may have values derived. The datasets representing a fundamental product may be cleansed using the techniques described herein and used as a basis for deriving datasets of the other products of the group. In this way, data elements of the datasets for the products of the group will have consistent pricing values.

Datasets may contain anomalies. The anomalies may involve missing data elements of the ordered dataset or data elements containing flawed values. These anomalies are removed through a generation of a data element for the missing data element, and an insertion of the generated data element into the dataset at the ordered position of the missing data element. Also, anomalies involving data elements having flawed values may be identified and those data elements may be removed from the dataset. The data elements having flawed values may also be modified to have non-flawed values. Further, if an element having a flawed value is removed, a replacement data element may be generated to provide for the missing data element at the position of the ordered dataset in which the data element was removed.

To generate data elements for the missing or removed data elements, datasets may be characterized as seasonal and non-seasonal, depending on the applicability of seasonal external factors to the values of the dataset. Specific patterns may be associated with the seasonal and non-seasonal datasets. Further, the patterns may indicate a technique to be used to determine values for the generated data elements. Also, the location of the missing data element in the ordered set relative to existing data elements may also indicate a technique to be used to determine values for the generated data elements. For example, in a non-seasonal dataset having missing elements between existing elements, linear interpolation based on the values of the surrounding data elements may be used to determine a value. Also, for missing data elements at the end of the same dataset, linear extrapolation based on the last several data elements may be used to determine values.

In another dataset, a system factor may indicate that the values for the data elements are consistent through contiguous temporal groupings, such as is the case with strip traded coal futures, but also characterized by non-seasonal value stability. In a dataset having these characteristics, a stepped pattern may be indicated. Piece-wise constant interpolation techniques and parallel shift/flat extrapolation techniques may be used to determine values for missing data elements based on the stepped pattern of the dataset.

In another dataset, the data values may be characterized by a seasonal factor. For such datasets an oscillating pattern is typically indicated by the values of the dataset. In this dataset a backbone and shape technique may be used to determine values for missing data elements.

In another dataset, seasonal and trading system factors may provide that the dataset has an oscillating nature and a limited or small number of data values used to provide a forward curve for the product of the dataset (i.e. a short curve). In this dataset a local min/max technique is implied based on the oscillating pattern of the dataset values.

In an embodiment, a dataset represents a fundamental product of a group of products. The fundamental product price values are cleaned to remove data elements having incorrect values, such as outlier values that vary from a pattern or other value of the dataset. The outliers may be determined using a threshold value indicating an acceptable variance from the pattern or other value. Datasets having price values for the data elements determined based on the price values of the fundamental dataset may be built using the cleaned fundamental dataset. This may allow for price value consistency throughout the related dataset group that will share the characteristics of a common underlier. Further, different dataset groups, or fundamental datasets, may be put into different categories based on external factors, such as seasonal or non-seasonal, to establish the techniques used to generate missing data elements based on the shared pattern and data characteristics of the underlier for the category.

Datasets for forward curves cleansed using the techniques and systems described herein will preserve a high correlation at the back of the respective forward curve where data element gaps often occur. Further, artificial correlations, data breaks, and/or data anomalies may be reduced. Further, datasets for forward curves of products may have generated data elements that more closely and consistently reflect values of actual prices for the product at those data element increments. Cleansed datasets may be used to provide high quality data to achieve better margin model results such that more effective performance bond requirements may be determined. Also, system operations such as rolling return time series back testing and stress testing may also use the datasets cleansed herein to provide for more accurate and realistic testing and simulation results, thus resulting in a better functioning electronic trading system.

In accordance with aspects of the disclosure, systems and methods are disclosed for dataset cleansing. The disclosed embodiments are preferably implemented with computer devices and computer networks, such as those described with respect to FIG. 4, that allow users, e.g. market participants, as well as electronic marketplaces, and parties related to the execution thereof, to exchange information. It will be appreciated that the plurality of entities utilizing the disclosed embodiments, e.g. the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading and/or electronic message management is shown in FIG. 1A. An exchange computer system 100 receives orders and transmits market data related to orders and trades to users, such as via wide area network 126 and/or local area network 124 and computer devices 114, 116, 118, 120 and 122, as will be described below, coupled with the exchange computer system 100. Also, the exchange computer system 100 may include a data cleansing module 140 that operates to clean datasets for reference by other modules of the exchange computer system 100, such as the market data module 112 and the risk management module 134. Further, the exchange computer system 100 may be operable to facilitate messaging or other communication between a market maker 130 and/or the computer devices 114, 116, 118, 120 and 122 via wide area network 126 and/or local area network 124, particularly as it relates to information based on the cleansed data provided by the data cleansing module 140.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, user names, passwords, a preferred contact method, and contact information for the preferred contact method. An account data module 104 may be provided which may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to pre-process received electronic messages including orders, for example to decompose delta based and/or bulk order types for processing by the order book module 110 and/or match engine module 106. A data cleansing module 140 may be included to, among other things, clean reference data for use by the modules of the exchange computer system 100, as well as for communicating reference data with users associated with computer devices 114, 116, 118, 120 and 122. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

In an embodiment, the data cleansing module 140 may be configured to be in communication with the market data module 112 and/or the trade database 108 to receive data elements indicating a value at which a product was traded. The data cleansing module 140 may also be configured to accumulate and/or group data elements representing values for a same product, but different associated times or time values for the product (e.g. times to delivery or delivery dates). The accumulated data elements may be assembled into an ordered dataset of data elements, based on the time values of the data elements. The ordered dataset may further be used to generate a forward curve for the product, or as a reference for other modules or traders without explicit formulation into a forward curve.

The risk management module 134 may communicate with the data cleansing module 140 to acquire a reference dataset to determine or otherwise quantify a risk of a trader or group of traders, relating to one or more portfolios of the respective trader or traders. For example, a trader may have a portfolio of products, with at least one of the products requiring the use of a dataset to determine a realistic and/or accurate current price of the product, based on a cleansed dataset for the product. The risk management module 134 may then determine a current and/or future risk for the product based on the referenced clean dataset, for example through the use of shock testing or other techniques. Also, the market data module 112 and/or the match engine module 106 may use cleansed datasets to provide reliable, accurate, and realistic product price information to traders.

In an embodiment, the data cleansing module 140 may operate to remove anomalies from a dataset that involves a plurality of ordered data elements, for example as provided by a market data module 112. The ordered data elements may involve a sample of a system that historically operates according to a pattern, such as an electronic trading or exchange system for a product. The data cleansing module 140 may be further configured to establish a historical pattern of values of the data elements of the system. The historical pattern may then be used to determine and/or define one or more threshold values for the data elements. The data cleansing module 140 may also be configured to compare a value of each data element to the threshold value, or values, and remove any of the plurality of data elements from the dataset when the value deviates from (i.e. exceeds or falls below) the threshold value, or values. The removal of such data elements may result in the generation of a smoothed dataset. The data cleansing module 140 may also be configured to determine prior, during, and/or subsequently whether any data elements are missing from the ordered dataset. Data elements may be generated to provide for the increments, or positions, of the ordered dataset missing data elements. The new data elements are generating in accordance with, or otherwise taking into account, the historical pattern, and added to the dataset in the appropriate position, or increment.

The trading and communication network environment shown in FIG. 1A includes exemplary computer devices 114, 116, 118, 120, 122, which depict different exemplary methods or media by which a computer device may be coupled with the exchange computer system 100 or by which a user may communicate, e.g. send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1A, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1A also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1A may be controlled by computer-executable instructions stored on a non-transitory computer-readable medium. For example, the exemplary computer device 116 may include computer-executable instructions for receiving order information from a user and transmitting that order information to exchange computer system 100. In another example, the exemplary computer device 118 may include computer-executable instructions for receiving market data or other messages from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1A is merely an example and that the components shown in FIG. 1A may include other components not shown and be connected by numerous alternative topologies.

As shown in FIG. 1A, the Exchange computer system 100 may further include a message management module which may implement the disclosed mechanisms for managing electronic messages (e.g. electronically submitted trades and/or other market data) sent between an exchange and/or a plurality of communication system participants. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

Figure 1B:
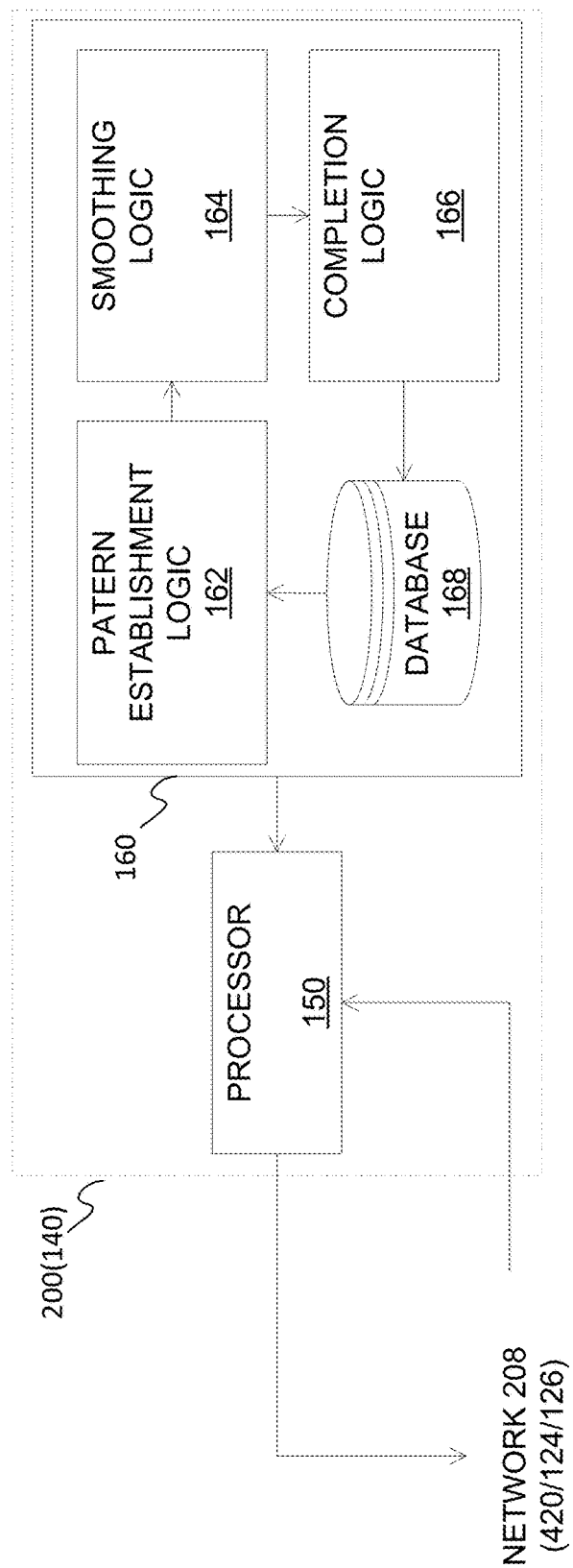

FIG. 1B depicts a block diagram of a data cleansing module 140 according to one embodiment, which in an exemplary implementation, is implemented as part of the exchange computer system 100 described above.

FIG. 1B shows a system 200 for cleansing a dataset and communicating the dataset via a network 208 which may be the network 420 described below or network 124 or 126 described above, which may be implemented as a dataset cleansing module 140 as described above. The system 200 may involve functionality to facilitate the cleansing and management of datasets containing value data of a market. It will be appreciated that the disclosed embodiments may be applicable to other types of datasets depending upon the implementation. Further, the datasets, and/or the data elements contained therein, may be communicated throughout the system using one or more data packets, datagrams or other collection of data formatted, arranged configured and/or packaged in a particular one or more protocols, e.g. the FIX protocol, TCP/IP, Ethernet, etc., suitable for transmission via a network 214 as was described, such as the dataset communication format and/or protocols.

The system 200 includes a processor 150 and a memory 160 coupled therewith which may be implemented as processor 402 and memory 404 as described below with respect to FIG. 4. The system 200 further includes a dataset store configured to store one or more datasets involving a collection of data elements. The data elements may be organized in an ordered or standardized manner. Each of the data elements may contain data indicating a sample of a value of a system. Such a system may operate according to a pattern and be influenced by external factors.

The data cleansing module 200 may include a pattern logic 162 that is stored in the memory 160 and executable by the processor 150 to establish a historical pattern of values of the system. The pattern may be established based on other historical data of the system. The pattern may be indicated and/or characterized by external factors. For example, the pattern may be characterized by a meteorological factor, a temporal factor, system factors, or combinations thereof. The pattern logic 162 may access the dataset store 168 to identify a particular data set and/or associate a pattern with a dataset. The pattern may involve and exhibit characteristics of the data, such as the existence of external factors that influence the values of the dataset.

The data cleansing module 200 may also include a smoothing logic 164 that is stored in the memory 160 and executable by the processor 150 to establish a threshold value based on the pattern. The smoothing logic 164 may also be operable to be executed by the processor 150 to compare a value of each data element of the dataset to the threshold value and generate a smoothed data set by removing any of the plurality of data elements from the data set when the value deviates from the threshold value.

The data cleansing module 200 may include a completion logic 166 that is stored in the memory 160 and executable by the processor 150 to determine whether any data elements are missing from a data set and, for each data element determined to be missing, generate a new data element for the missing data element in accordance with the pattern. Also, the data completion logic 166 may operate on a smoothed dataset, subsequent to the removal of data elements. The completion logic 166 may also be executable by the processor to generate a complete data set that contains the original data elements and the new data elements. Further, the complete data set may contain the smoothed dataset and the new data elements.

Figure 2:
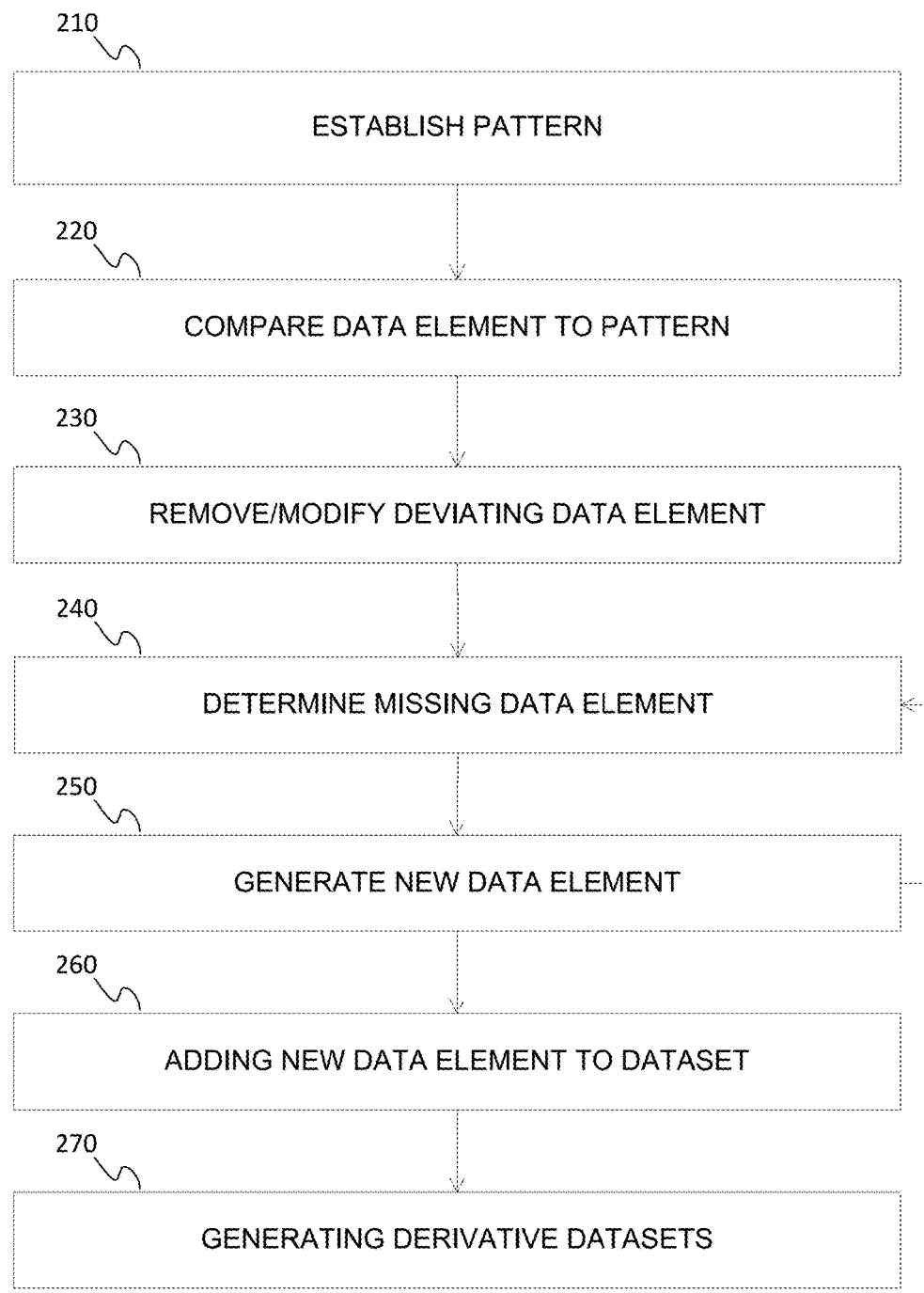
FIG. 2 depicts a block diagram of embodiments for dataset cleansing.

FIG. 2 depicts a flow chart showing operation of the data cleansing module 140 of FIG. 1. In particular FIG. 2 shows a computer implemented method for cleansing data. The operation includes establishing a pattern of values for datasets of a particular system (Block 210), comparing data element values to the pattern (Block 220), removing deviating data elements (Block 230), determining missing data elements (Block 240), generating new data elements (Block 240), adding new data elements to the dataset (Block 260), and generating derivative datasets (Block 270). Additional, different, or fewer indicated acts may be provided. The indicated acts may be performed in the order shown or other orders. The indicated acts may also be repeated, for example, determining a missing data element (Block 240) and generating a new data element (Block 250) may be repeated. Alternatively, or in addition thereto, multiple missing data elements may be determined (Block 240) with new data elements (Block 250) being generated concurrently to provide for the missing data elements.

Data elements of a dataset may involve a value, such as a price for a product, as well as a time based component values. The time based component values may be any value relating to time, such as a time to maturity, time to delivery requirements, date, or any other time based component. The dataset may be ordinated based on the time based component values. For example, products may involve a month specified for a delivery of an underlier. As such, a dataset may be configured so as to have a position in each dataset for each month.

The pattern may be established (Block 210) using any technique. The pattern is a pattern existent in values of data elements of an ordered dataset. The pattern may be established through a recognition and/or identification of external factors that characterize and/or otherwise affect the data values of the dataset. For example, meteorological factors, temporal factors, or combinations thereof may characterize the values. The pattern may be a pattern indicated from previous or historical data. For example, historical data elements sampled from the system may be used to generate a pattern. A pattern may also be determined based solely on existent external factors that characterize the dataset. Also, a pattern may be determined based on current data for the data set. In an embodiment involving a dataset relating to a forward curve for a futures product, the product attributes may also be used in establishing the pattern.

In an embodiment, a combination of temporal factors and meteorological factors result in a seasonal factor. The seasonal factor may indicate an oscillatory character of the data.

Thus, an oscillatory pattern may be established for a dataset. Further, a lack of seasonality may characterize a dataset. For example, a dataset lacking seasonality may be characterized by a generally linear relationship of the values. Thus a linear pattern may be established for such a dataset.

Other external factors may also characterize the data. For example, factors relating to the operation of a system that generates the data may characterize the data. For example, the system may be a trading system for a product, and the product may be trading in successive temporal groupings, such as contracts having delivery requirements in successive groups of months. For example, some trading systems trade strips of contracts in three month increments. As such, the value for data elements generated by such a system may indicate a consistent price value for data elements over month groupings. The values for the groupings may change between grouping, thus following the systems activity as driven by the demand and/or activity of the product. As such, a stepped pattern may be established.

Data elements may be compared to the pattern (Block 220). The data elements may be compared using any technique. In an embodiment, a threshold value is determined. The threshold value may be a value from which a value of a data element may vary at a maximum to be considered part of the dataset. The threshold may be a predetermined set value, or a value variable based on other values of the dataset. Also, the established pattern may be used to determine a predicted value of a position or increment of the ordered dataset, and the value of the data element at that position may be compared to the predicted value.

Data elements may be removed or modified (Block 230) if the value of the data element deviates from a predicted value, or other acceptable value. For example, if a value of a data element does not adequately match a predicted value for the data element, the data element may be removed from the dataset. Alternatively, the value for the data element may be modified to match the predicted value. Further, a threshold may be used to determine an acceptable variance and/or deviation from an expected value. As such, values of data elements deviating from (e.g. exceeding or falling below) the expected value by more than the threshold, may be removed or have the value for the data point modified to be within the threshold.

In an embodiment, comparing the data element to a pattern (Block 220) and removing/modifying the data elements (Block 230) may be a smoothing of the dataset, and thus result in a smoothed dataset. As indicated above, such smoothing may involve the pattern, and thus leave out noisy data elements of the dataset. Therefore, a smoothed dataset of an ordered dataset may involve gaps, empty positions, or increments having no data elements. The gaps may result from the removal of data elements, as described above, or a lack of data originally generated by a system from which the data was drawn.

Missing data elements may be determined (Block 240). The missing data elements are missing data elements of the order dataset. The missing data elements may be from a lack of data for that particular element and/or from the removal of data elements such as indicated above (Block 230). The missing data elements may be determined using any technique. In an embodiment, the data elements may be ordered consecutively and analyzed for incremental gaps in the dataset. The incremental gaps indicate missing data elements. Further, in an embodiment involving datasets relating to futures products, listing rules for the product may provide an ordinated sequence of products for which data may be available, and gaps in the data set as compared to the ordinated sequence may indicate missing data elements.

Figure 3A:
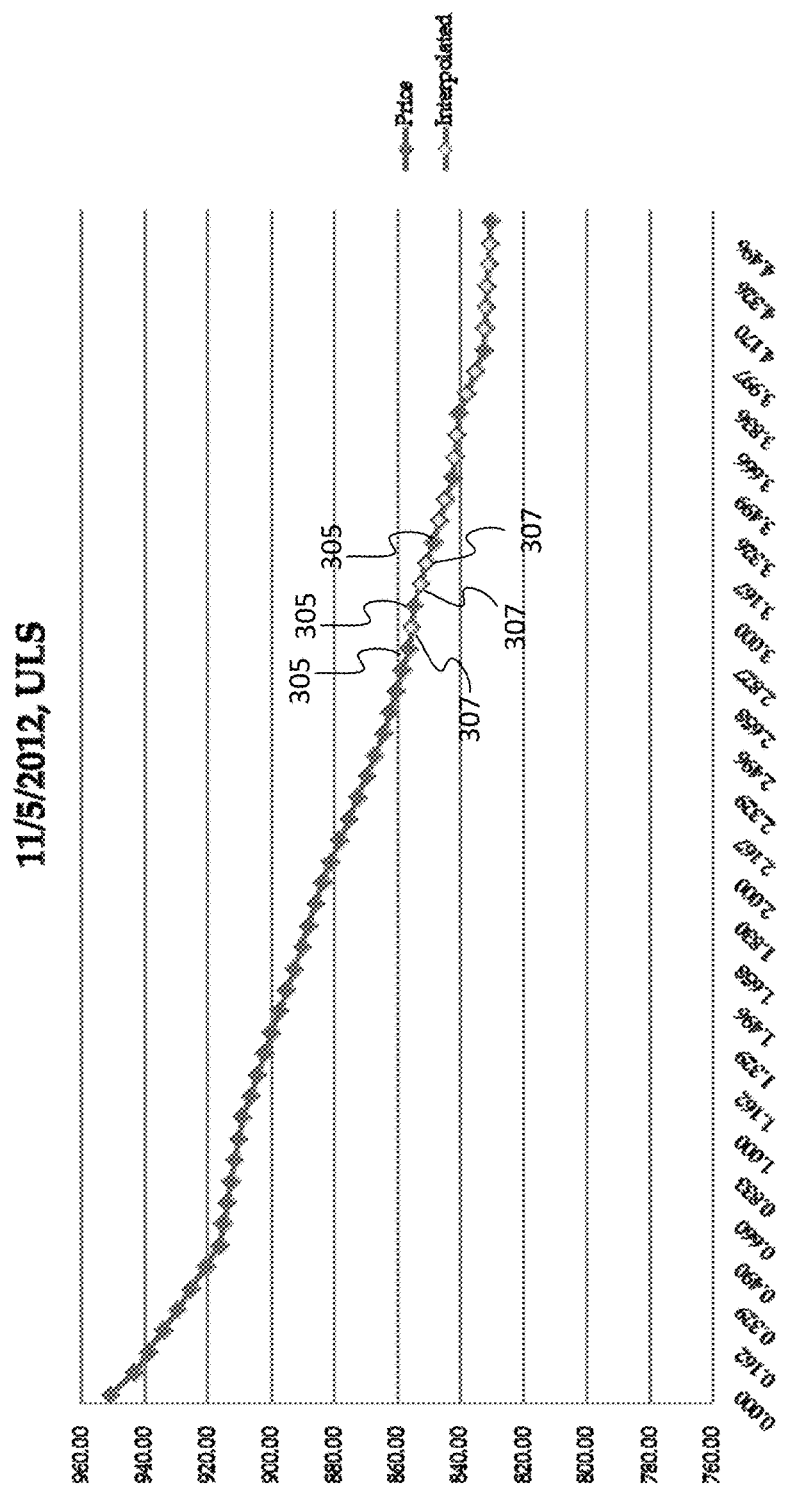

New data elements are generated (Block 250). The new data elements are generated to fill the gaps identified in the dataset (Block 240). The data elements may be generated with values indicated by the pattern (Block 210). Specific interpolation and/or extrapolation techniques may be used to determine values for data elements. Different new data elements of the same dataset may have values generated using different techniques. For example, different techniques may be used for extrapolating data values and interpolating data values of a dataset. The techniques may be selected to particularly account for the characteristics of the dataset values as characterized by the pattern, for example as is described further below with respect to FIGS. 3A-3K. In an embodiment, parallel/flat extrapolation techniques and linear interpolation techniques are used to generate values for non-seasonally characterized datasets in general. Further system factors characterizing some datasets, such as datasets representing a product traded in strips, may have a piecewise plus constant interpolation techniques applied to generate values. Also, seasonally characterized datasets may have various techniques applied to correspond with their respective oscillatory patterns. For example, backbone plus shape techniques, local min/max techniques, or combinations thereof may be used for the generation of values for new data elements. A summary of techniques as applied to particular datasets of trading systems in an embodiment is illustrated in FIG. 3L. Also, the determination of missing data elements (Block 240) and the generation of new data elements (Block 250) may be repeated. In an embodiment, new data elements are generated and subsequent data elements are generated based at least in part on the value of the previously generated new data element.

The new data element is added to the dataset (Block 260). The new element is added to the dataset at the ordinated position of the missing data element the new element was generated to fill. Further, multiple new elements may be added to the dataset. In an embodiment, all of the ordinated positions determined to be missing a data element (Block 240) may have new data elements generated (Block 250) and added to the dataset (Block 360) to generate a complete dataset. That is, all of the positions of a complete dataset may have corresponding data elements. Generating and adding new data elements for all of the gaps of a dataset is completing the dataset.

In an embodiment, derivative datasets may be generated based at least one completed dataset (Block 270). For example, some products of an electronic trading system use prices of a basic or fundamental product, or products, to determine a price of a derived product. Combinations of fundamental product cleansed datasets may also be used as a basis for determining other product prices. The prices for the derived product may be determined using the pricing scheme and/or algorithm specifically determined for the system trading the derived product. Maintaining a common fundamental product cleansed dataset may allow for consistency in pricing and/or risk determination of all products based thereon.

FIGS. 3A-L illustrate various data element value generation techniques. The techniques are specifically configured to account for a historical pattern of the values as characterized by an external factor, such as temporal, meteorological, and/or system factors. In these embodiments, the pattern is indicated by the shape of the forward curves for products represented by the data sets, the prices of the products being influenced by such external factors.

In an embodiment, generating a data element involves generating the at least one data element for a time of a time based component value that falls between time based component values of two sampled data elements. An example of this ordinated time based interpolation is illustrated in FIG. 3A. FIG. 3A illustrates a data set representing a forward curve for a low sulfur gas oil (ULS) futures contract product. Data elements representing ULS values tend to exhibit a linear pattern, as characterized by a non-seasonal nature of ULS based products. The X-axis in FIG. 3A is a time to delivery requirements in years, and the Y-axis is a value for the data elements, such as a price for the product. In this example, linear interpolation is used to determine values for missing data elements 307 based on values of data elements existent in the dataset 305. In an embodiment, an average value, or average incremental value, is used to determine values based on the values of existing data elements 305 at various positions around the positions of missing data elements 307. Other orders of interpolation may be used for non-seasonal product based data element values as well, depending on the historical pattern of the data element values. For example, quadratic, cubic, or higher orders of interpolation may be used.

FIGS. 3B-3E illustrate data sets for forward curves of other non-seasonally characterized datasets, such as may be used for coal futures products (QL). A QL product has particular trading system factors that influence a historical pattern for the dataset values. For example, QL product contracts are typically traded in strips, or collections of contracts for contiguous months. As such, the patterns for the data element values tend to exhibit a stepped structure, as can be seen in FIGS. 3B-3E. FIGS. 3B-3E also illustrate an interpolation technique which may be used for stepped pattern datasets. Such a technique may be considered a piece-wise constant interpolation technique. There are several considerations when determining values for such stepped datasets.

FIG. 3B illustrates a first case for interpolation of a stepped pattern dataset. As can be seen from the figure, the values involve groupings 310 and an increment between values. This case involves a missing data element 312 of a grouping 310, where other data values of data elements 307 are known. In this case, generating a value for the missing data element 312 involves identifying a range of time based component values containing the missing data element, or grouping 310, and generating a data element 312 having a same data element value as the other data elements 307 of the range, or grouping.

FIG. 3C illustrates a second case for interpolation of a stepped pattern dataset. In this case, an entire grouping 318 of data elements is missing. The proceeding 316 and preceding 314 groupings are available. The values for the data elements of the missing grouping 318 may be determined as an average of the values for the proceeding 316 and preceding 314 groupings. Similarly, FIG. 3D illustrates a third case for interpolation of a stepped pattern dataset. In this case, two groupings 318 320 of data elements are missing, and bounded by proceeding 316 and preceding 314 groupings. In this case, the incremental different between the values of the proceeding 316 and preceding 314 groupings may be distributed evenly for both missing groupings (e.g. the total difference between proceeding 316 and preceding 314 grouping values, divided by two for the two missing groupings).

FIG. 3E illustrates a fourth case for interpolation of a stepped pattern dataset. Some stepped dataset patterns involve different sized groupings (e.g. strips) at various positions of a forward curve. In this case, the last two groupings of the forward curve are yearly groupings of data elements. This may be the case in datasets that involve trading systems that do not differentiate individual trading month values at a length of time in the future. As such, one or more data values 324 of a grouping that is part of a longer length grouping 326 may be missing, however, the grouping may indicate a value for some of the data elements 322 of the grouping. The group sizing of the grouping having missing data elements may be indicated by a proceeding grouping 328, or by other techniques. The missing data elements 324 of a grouping 326 may be generated with values matching the values of other data elements 322 in the grouping.

Also, generating data elements may involve generating the data elements beyond a sampled data element having the longest time based component value. For example, the data elements representing parts of a forward curve at the end of the curve may be missing. These extended values may also be determined based on the historical pattern of the dataset, as well as the values of sampled data elements in the dataset.

Figure 3F:
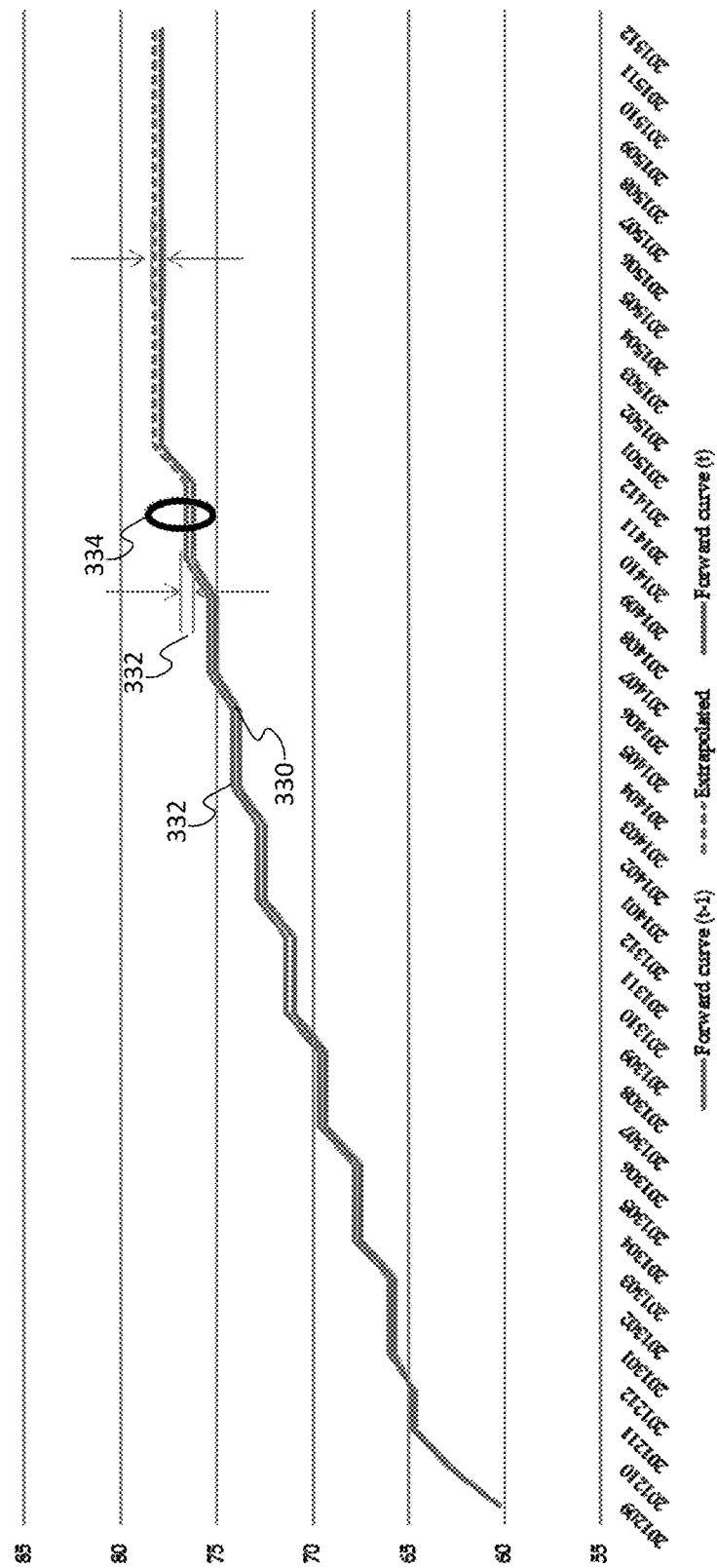

Stepped historical pattern datasets may also have values for data elements extrapolated to complete or otherwise augment a dataset. FIG. 3F illustrates a parallel shift technique to provide values for data elements of a stepped pattern dataset. The parallel shift technique may involve detecting a shift value of the values between the time based groupings, establishing the data value for a next sequential grouping after a time based grouping of historically sampled data having the longest time based component value of the data elements based on the shift value, and generating data elements for the next sequential grouping, the generated data elements having the established data value.

Further, as illustrated in FIG. 3F, a specific historical pattern 330 for the dataset may be provided. The historical pattern may be derived from, or take the values of, previous datasets for the system that generated the dataset 332. A difference or shift between values for the historical pattern 330 and values of the dataset 332 may be determined. The shift value 332 may be determined between data elements in an immediately preceding or adjacent grouping and the historical pattern values, such as the data elements and pattern values indicated 334 in FIG. 3F. The shift value may then be added to the values of the historical pattern corresponding to the positions of missing data elements for a complete dataset. The resulting values may be used as values for data points generated to fill the void in the dataset indicated by the missing data elements. Further, once a shift value is determined, a flat extrapolation may be provided for additional data element values such that the additional data element values may be the same as a first value for a data element grouping.

Values for data elements of datasets that are characterized by temporal and/or meteorological factors may also be determined. Some such datasets may be characterized by a seasonality that indicates an oscillatory pattern for the values of the dataset. FIGS. 3G-J illustrate a technique for generating values for seasonally characterized datasets, such as the dataset 332 of FIG. 3I. Such a technique may involve determining average values of the data elements over the time based component values, the average values determined as groupings of successive data elements over the time based component values. The technique may also involve determining variation values of the oscillation of the data set values for the data elements of an oscillation, and generating at least one data element according to a combination of the average values and the variation values. For example, a backbone plus shape technique may be used.

Figures 3G, 3H, 3I:
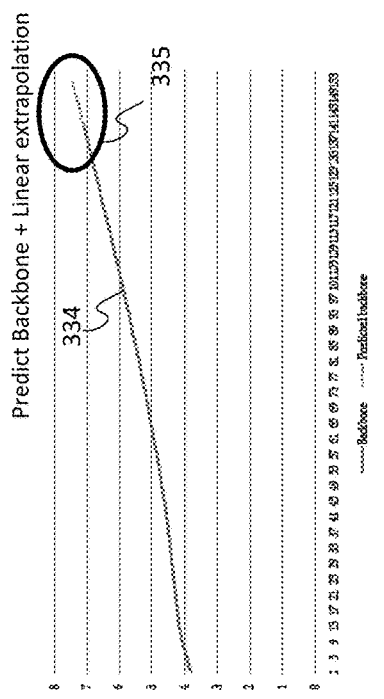

FIG. 3G illustrates a resulting linear shaped pattern of values for the dataset 334 (i.e. a backbone). This linearly shaped pattern may be generated through a moving average of the values of the dataset. For example, a window of values, such as values for the three data elements after and before a particular data element, may be averaged. This average value may be placed in the particular data element position. This technique may be repeated for all the data elements of the dataset to generate the moving average linear shaped pattern 334. Backbone values for missing data elements may be generated by extending the linear shaped pattern 334, for example by using a linear extrapolation for the linear shaped pattern. Also, residual values 336 of the dataset 332 may be determined as the original value of the data elements minus the moving average value for the particular data elements. Values of the end oscillatory cycle of the residual values 336 may be used to generate mirror or extrapolated values 337 for additional cycles of extended data elements after the end of the dataset. FIG. 3I then illustrates values determined as an extension, or extrapolation, of values for data elements 339 as determined from the original dataset 332. The values for the extended data elements 339 may be determined as the sum of the moving average extrapolated values for the extended data elements 335 and the residual values for the extended data elements 337.

Missing data element values may also be determined for other types of seasonally characterized datasets as well. For example, a system generating the data elements of a dataset may provide that there are a limited number of data elements, for example less than 24 data elements. Such a system may be a system that involves trading products having a delivery requirement in a particular month that involves contracts of no longer than two years.

As is indicated above, data elements may be missing from the ends of such datasets. Generating data elements for these missing data elements involve extrapolating values for the new data elements based on values of the existing data elements. Determining values for the new data elements may involve locating a maximum value data element and a minimum value data element of an oscillation adjacent to an end data element, the end data element being a data element having the longest time based component of the dataset. Also, determining the values may involve determining a first number of data elements between the maximum value data element and a minimum value data element, and determining a second number of data elements separating the end data element from the closer data element of the maximum value data element or the minimum value data element. The data element may be generated having a value the same as a value of the end data element when the second number is within a defined range of the first number. A data element may also be generated having a value determined through a linear extension value of at least the end data element and the next previous data element when the second number is outside of a defined range of the first number.

Figure 3J:
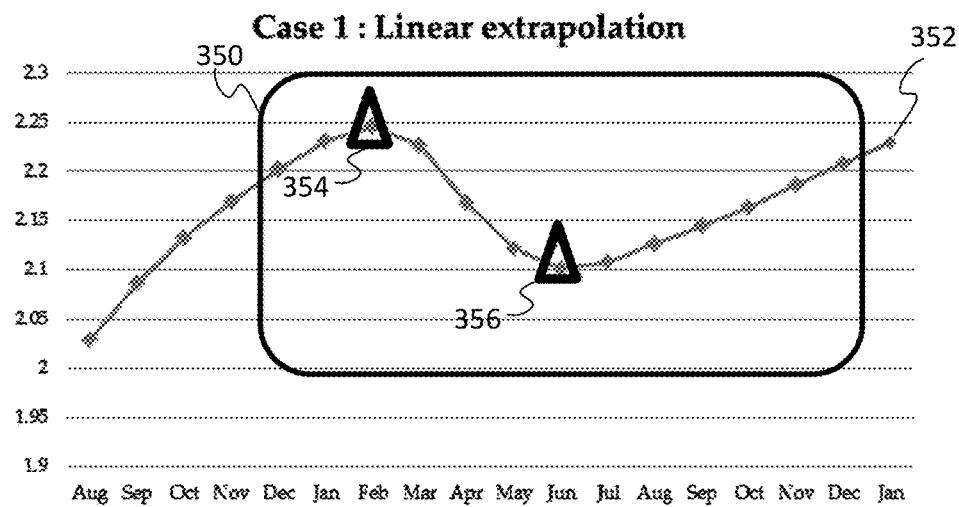
Figure 3K:
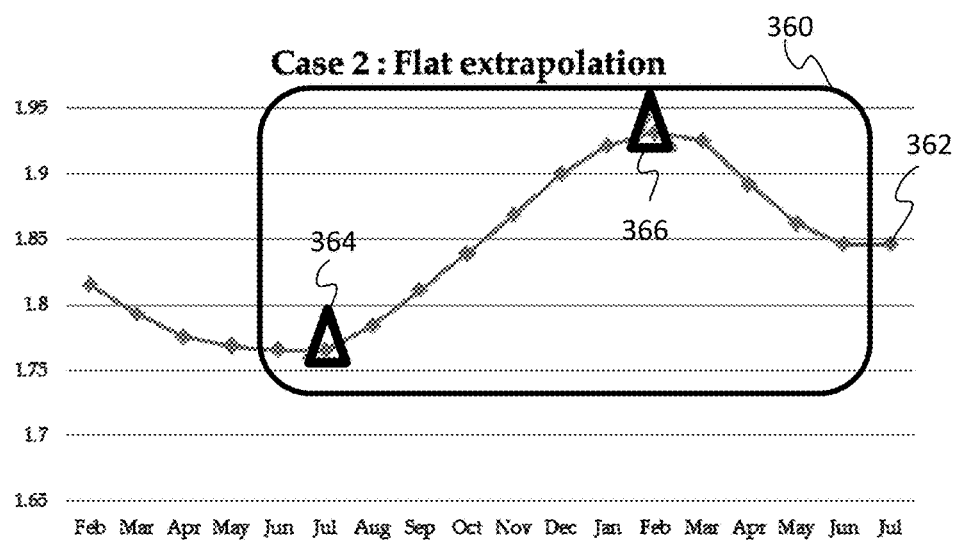

FIGS. 3J and 3K illustrated data sets for forward curves of other seasonally characterized datasets, including limited or smaller numbers of data elements. A cyclic or oscillatory pattern of data elements 350 360 is illustrated, as indicated by the seasonality of the datasets. Maximum value data points 354 366 may be identified for the respective data sets 350 360. Minimum value data points 356 364 may also be identified for the respective data sets 350 360. A placement of the missing data points 352 362 may be determined from the relative position within the cycle of the datasets that the missing data points 352 362 will fall. As indicated in FIG. 3J linear extrapolation may be used to determine values for an extended data point 352 not at a relative minimum or maximum position of the cycle. FIG. 3J, however, illustrates that when a missing data element falls in a minimum or maximum location of a dataset value cycle, a flat extrapolation may be used to determine a value for an extended data element 362. As such, data elements may be generated for missing data elements that exhibit the seasonal and shortened nature of the datasets.

Figure 4:
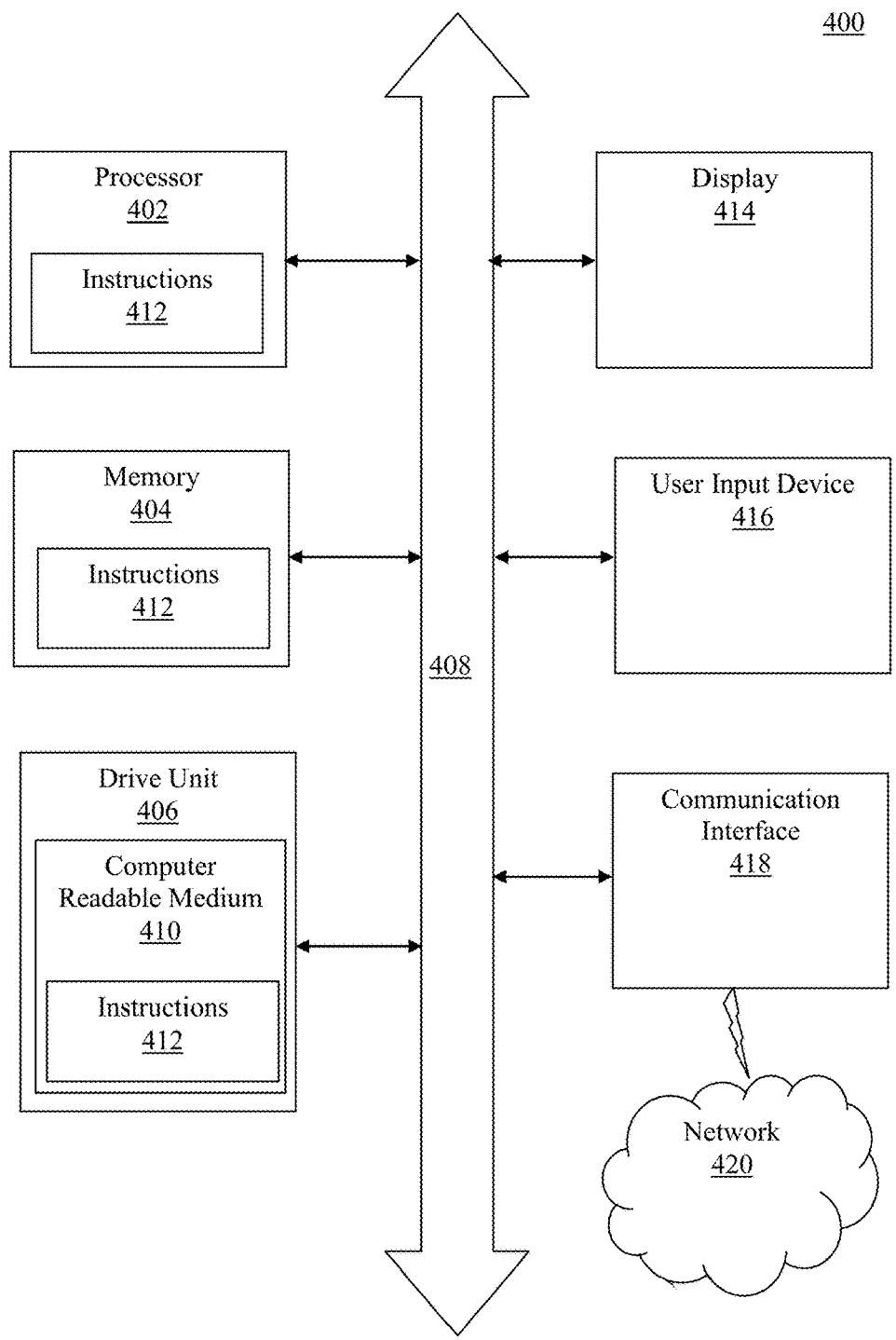
FIG. 4 shows an illustrative embodiment of a specialized computer system configured for dataset cleansing.

Referring to FIG. 4, an illustrative embodiment of a specialized computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, such as the processor 202, may be a computer system 400 or a component in the computer system 400. In an embodiment, the computer system 400 involves a custom combination of discrete circuit components. The computer system 400 may implement embodiments for dataset cleansing.

For example, the instructions 412 may be operable when executed by the processor 402 to cause the computer 400 to remove anomalies from a dataset involving ordered data elements, each of the ordered data elements may be a sample of a system that historically operates according to a pattern. The instructions 412 may be operable to remove the anomalies by establishing a historical pattern of values of the data elements of the system and based thereon defining a threshold value, comparing a value of each data element to the threshold value and removing any of the plurality of data elements from the data set when the value deviates (exceeds or falls below) from the threshold value to create a smoothed dataset; and determining, subsequent to the removing, whether any data elements are missing from the smoothed dataset and based thereon generating at least one new data element for the missing data element in accordance with the historical pattern and adding the new data element to the smoothed dataset.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The processor 402 may be configured to cause the system 400 to implement a method of removing anomalies from a dataset comprising a plurality of ordered data elements, each of the plurality of ordered data elements comprising a sample of a value of a system at a particular state, the system historically operating according to a pattern. The system implementing the method may be specifically configured for establishing a pattern of values of the system and, based thereon, defining a threshold value. The system may also be configured to compare a value of each data element to the threshold value and generating a smoothed data set by removing any of the plurality of data elements from the data set when the value deviates from the threshold value. The system may also be configured to determine, subsequent to the removing, whether any data elements are missing from the smoothed data set and, for each data element determined to be missing, generating a new data element for the missing data element in accordance with the pattern, and generate a complete dataset comprising the data elements of the smoothed dataset and the new data elements.

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400. In an embodiment, the input device 416 may facilitate a user establishing a historical pattern for a dataset. For example, the display 414 may provide a listing of optional, or predetermined, patterns or pattern types, and the input device 416 may allow for the selection of a pattern from the presented patterns. Optionally, the input device 416 may also allow for the entry of new patterns.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly. In an embodiment, the communication interface 418 may be configured to communicate cleansed datasets with user or trader devices.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a reconfigurable logic device or an ASIC (application specific integrated circuit). As used herein, the terms "microprocessor" may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" will refer to data processing functionality that is deployed on a computer. The term "firmware" will refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together"—somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory. In an embodiment, the processors 211, 221, 231 shown in FIG. 2 may be implemented using an FPGA or an ASIC. For example, the receiving, augmenting, communicating, and/or presenting may be implemented using the same FPGA.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method of removing anomalies from a dataset comprising a plurality of ordered data elements stored in a dataset store, each of the plurality of ordered data elements comprising a sample of a value of a system at a particular state, the system historically operating according to a pattern, the method comprising:
    establishing, by a specifically configured processor using pattern logic stored in a memory coupled with the processor, a pattern of values of the system stored in the dataset store and, based thereon, executing smoothing logic stored in the memory to define a threshold value;
    comparing, via the execution of the smoothing logic by the processor, a value of each data element in the dataset store to the threshold value and generating a smoothed data set by removing any of the plurality of data elements from the data set when the value deviates from the threshold value;
    determining, by completion logic executed by the processor subsequent to or concurrently with the removing, whether any data elements are missing from the smoothed data set and, for each data element determined to be missing, generating a new data element for the missing data element in accordance with the pattern; and
    generating, by the completion logic executed by the processor, a complete dataset comprising the data elements of the smoothed dataset and the generated new data elements.

2. The computer implemented method of claim 1, wherein the pattern is characterized by a meteorological factor, a temporal factor, or a combination thereof.

3. The computer implemented method of claim 1, wherein the plurality of ordered data elements of the dataset are related to a fundamental product of a group of products.

4. The computer implemented method of claim 1, further comprising:
    generating at least one derivative dataset based on the values of the data elements of the complete dataset.

5. The computer implemented method of claim 1, wherein the data elements further comprise a time based component value.

6. The computer implemented method of claim 5, wherein the generating the at least one data element comprises generating the at least one data element for a time of a time based component value that falls between time based component values of two sampled data elements.

7. The computer implemented method of claim 6, wherein the pattern is a linear pattern, and wherein the generating at least one data element comprises:
    generating a data element having a data element value determined as an average of at least the closest two surrounding data element values.

8. The computer implemented method of claim 5, wherein the pattern involves time based groupings of data elements, and wherein the time based groupings share a data value for a range of time based component values.

9. The computer implemented method of claim 8, wherein the pattern is a piece-wise plus a constant pattern over the time values of the time based component values of the data set, and wherein the generating at least one new data element comprises:
    identifying a range of time based component values containing the missing data element, and
    generating a data element having a same data element value as the other data elements of the range.

10. The computer implemented method of claim 5, wherein the generating the at least one data element comprises generating the at least one data element beyond the sampled data element having the longest time based component value.

11. The computer implemented method of claim 10, wherein the pattern involves time based groupings of data elements, wherein the time based groupings share a data value for a range of time based component values, and wherein generating the at least one data element comprises:
    detecting a shift value of the values between the time based groupings,
    establishing the data value for a next sequential grouping after a time based grouping of historically sampled data having the longest time based component value of the data elements based on the shift value, and
    generating data elements for the next sequential grouping, the generated data elements having the established data value.

12. The computer implemented method of claim 11, wherein the generating the at least one data element further comprises:
    establishing a further data value for a further sequential grouping based on the shift value, the further sequential grouping having a longer time based component value than a time based component value of any data element of the next sequential grouping and the further sequential grouping having a larger range of time for the time based component values than other groupings of the dataset, and
    generating data elements for the further sequential grouping having the further data value.

13. The computer implemented method of claim 10, wherein the pattern involves oscillating data element values over the progression of the time based component values of the dataset, and wherein the generating the at least one data element comprises:
    determining average values of the data elements over the time based component values, the average values determined as groupings of successive data elements over the time based component values,
    determining variation values of the oscillation of the data set values for the data elements of an oscillation, and
    generating at least one data element according to a combination of the average values and the variation values.

14. The computer implemented method of claim 10, wherein the pattern involves oscillating data element values over the progression of the time based component values of the dataset, and wherein the generating the at least one data element comprises:
    locating a maximum value data element and a minimum value data element of an oscillation adjacent to an end data element, the end data element being a data element having the longest time based component of the dataset,
    determining a first number of data elements between the maximum value data element and a minimum value data element, determining a second number of data elements separating the end data element from the closer data element of the maximum value data element or the minimum value data element, generating a data element having a value the same as a value of the end data element when the second number is within a defined range of the first number, and generating a data element having a value determined through a linear extension value of at least the end data element and the next previous data element when the second number is outside of a defined range of the first number.

15. A computer system specifically configured for removing anomalies from a dataset comprising a plurality of ordered data elements, each of the plurality of ordered data elements comprising a sample of a system that operates according to a pattern, the system comprising:

a memory operable to store the dataset; and a computer processor, coupled with the memory, the computer processor configured to:

establish, using pattern logic stored in the memory, a historical pattern of values of the system and, based thereon, define, using smoothing logic stored in the memory, a threshold value;

compare, using the smoothing logic, a value of each data element to the threshold value and generate a smoothed data set by removing any of the plurality of data elements from the data set when the value deviates from the threshold value;

determine, using completion logic stored in the memory, subsequent to or concurrently with removal of any of the plurality of data elements, whether any data elements are missing from the smoothed data set and, for each data element determined to be missing, generate a new data element for the missing data element in accordance with the pattern; and generate, using the completion logic, a complete dataset comprising the data elements of the smoothed dataset and the new data elements.

16. The system of claim 15, wherein the historical pattern is characterized by a meteorological factor, a temporal factor, or a combination thereof.

17. The system of claim 15, wherein the dataset is a dataset for a fundamental product of a group of products.

18. The system of claim 17, wherein the processor is further configured to:

generate at least one derivative dataset based on the values of the data elements of the complete dataset.

19. The system of claim 15, wherein the data elements further comprise a time based component value.

20. The system of claim 15, wherein the processor is further configured to generate at least one new data element through interpolation and extrapolation of existing data element values.

21. A non-transitory computer readable medium including instructions for removing anomalies from a dataset comprising a plurality of ordered data elements stored in a memory, each of the plurality of ordered data elements comprising a sample of a system that operates according to a pattern, that when executed by the computer system are operable to:

establish, using pattern logic stored in the memory, a pattern of values of the system and, based thereon, define, using smoothing logic stored in the memory, a threshold value;

compare, using the smoothing logic, a value of each data element to the threshold value and generate a smoothed data set by removing any of the plurality of data elements from the data set when the value deviates from the threshold value;

determine, using completion logic stored in the memory, subsequent to or concurrently with removal of any of the plurality of data elements, whether any data elements are missing from the smoothed data set and, for each data element determined to be missing, generate a new data element for the missing data element in accordance with the pattern; and generate, using the completion logic, a complete dataset comprising the data elements of the smoothed dataset and the new data elements.

* * * * *